United States Patent
Gannon

(10) Patent No.: US 9,870,093 B2
(45) Date of Patent: Jan. 16, 2018

(54) SYSTEM AND METHOD FOR IMPROVING TOUCH SCREEN DISPLAY USE UNDER VIBRATION AND TURBULENCE

(75) Inventor: Aaron James Gannon, Anthem, AZ (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 902 days.

(21) Appl. No.: 12/952,846

(22) Filed: Nov. 23, 2010

(65) Prior Publication Data
US 2012/0127115 A1 May 24, 2012

(51) Int. Cl.
G06F 3/041 (2006.01)
B60K 35/00 (2006.01)
B60K 37/06 (2006.01)

(52) U.S. Cl.
CPC ............ *G06F 3/0418* (2013.01); *B60K 35/00* (2013.01); *B60K 37/06* (2013.01); *B60K 2350/1028* (2013.01); *B60K 2350/2086* (2013.01)

(58) Field of Classification Search
None
See application file for complete search history.

(56) References Cited

U.S. PATENT DOCUMENTS

| | | | |
|---|---|---|---|
| 6,104,969 A | 8/2000 | Beeks | |
| 6,317,114 B1 | 11/2001 | Abali et al. | |
| 6,323,846 B1 * | 11/2001 | Westerman et al. | .......... 345/173 |
| 6,639,577 B2 | 10/2003 | Eberhard | |
| 6,900,795 B1 | 5/2005 | Knight, III et al. | |
| RE40,153 E | 3/2008 | Westerman et al. | |
| 7,656,393 B2 | 2/2010 | King et al. | |
| 7,843,427 B2 | 11/2010 | Ording et al. | |

(Continued)

FOREIGN PATENT DOCUMENTS

| | | |
|---|---|---|
| CN | 1262479 A | 8/2000 |
| CN | 101137276 A | 3/2008 |

(Continued)

OTHER PUBLICATIONS

Unofficial translation of JP Office Action issued in connection with corresponding JP Application 2011-252140. Office Action is dated Feb. 9, 2016.

(Continued)

*Primary Examiner* — Duane N Taylor, Jr.
(74) *Attorney, Agent, or Firm* — GE Global Patent Operation; William S. Munnerlyn

(57) ABSTRACT

A method and system for improving touch screen display use during vibration and turbulence conditions is provided. The system includes a sensor configured to transmit a first input signal relative to a measured parameter of the vehicle, a touch screen input and display system configured to transmit a second input signal relative to a manual input by a user. The touch screen input and display system includes a planar input and viewing surface having a plurality of edges and a bezel at least partially surrounding the surface proximate at least some of the plurality of edges. The bezel includes a surface configured to engage one or more digits of one or more hands of a user and is formed of an elastomeric material. The system also includes an input unit configured to receive the transmitted first and second input signals.

20 Claims, 2 Drawing Sheets

(56) References Cited

U.S. PATENT DOCUMENTS

| | | |
|---|---|---|
| 8,581,859 B2 | 11/2013 | Okumura et al. |
| 2006/0197754 A1 | 9/2006 | Keely et al. |
| 2006/0238517 A1* | 10/2006 | King et al. .................... 345/173 |
| 2006/0284839 A1* | 12/2006 | Breed et al. .................. 345/156 |
| 2007/0159466 A1* | 7/2007 | Kawell et al. ................ 345/169 |
| 2008/0053852 A1 | 3/2008 | Ko et al. |
| 2009/0015559 A1 | 1/2009 | Day et al. |
| 2009/0153438 A1* | 6/2009 | Miller et al. .................... 345/55 |
| 2009/0257207 A1 | 10/2009 | Wang et al. |
| 2009/0273583 A1* | 11/2009 | Norhammar ................. 345/177 |
| 2010/0149124 A1* | 6/2010 | Kim et al. .................... 345/173 |
| 2010/0171712 A1 | 7/2010 | Cieplinski et al. |
| 2010/0214249 A1 | 8/2010 | Ikeda et al. |
| 2011/0109576 A1* | 5/2011 | Giannelli ...................... 345/173 |
| 2011/0185317 A1* | 7/2011 | Thimbleby et al. .......... 715/863 |
| 2011/0234639 A1 | 9/2011 | Shimotani et al. |
| 2011/0267280 A1* | 11/2011 | De Mers et al. ............. 345/173 |
| 2012/0105335 A1* | 5/2012 | Suddreth et al. ............. 345/173 |

FOREIGN PATENT DOCUMENTS

| | | | |
|---|---|---|---|
| EP | 0969404 | A2 | 1/2000 |
| EP | 2330487 | A1 | 6/2011 |
| JP | 01187626 | A | 7/1989 |
| JP | 10-240420 | A | 9/1998 |
| JP | 2000-305477 | A | 11/2000 |
| JP | 2002-140151 | A | 5/2002 |
| JP | 2002175155 | A | 6/2002 |
| JP | 2003233059 | A | 8/2003 |
| JP | 2006244154 | A | 9/2006 |
| JP | 2008195142 | A | 8/2008 |
| JP | 2009-009261 | A | 1/2009 |
| JP | 2010-157060 | A | 7/2010 |
| WO | 2010064423 | A1 | 6/2010 |

OTHER PUBLICATIONS

Unofficial English Translation of Chinese Office Action issued in connection with Corresponding CN Application No. 201110392682.1 dated Jul. 28, 2015.

European Search Report and Opinion issued in connection with Corresponding EP Application No. 11188736.0 dated Sep. 19, 2016.

Canadian Office Action issued in connection with Corresponding CA Application No. 2757793 dated Apr. 3, 2017.

* cited by examiner

SYSTEM AND METHOD FOR IMPROVING TOUCH SCREEN DISPLAY USE UNDER VIBRATION AND TURBULENCE

BACKGROUND OF THE INVENTION

The field of the invention relates generally to input devices, and more specifically, to a method and systems for improving touch screen display use during vibration and turbulence conditions.

At least some known touch screens with single- and multi-touch capability have enjoyed great success in consumer products, lending intuitive gesture-based control to functions like scrolling, panning, and zooming. However, their use in vehicles, such as on a flight deck of an aircraft is hampered by vibration and turbulence, which makes precise, accurate, and rapid finger and hand movements extremely difficult. Moreover, most aircraft displays must be anchored to the flight deck, transmitting vibration and turbulence directly to the display without any damping. Current generation cursor control devices have incorporated a turbulence hump for resting a wrist on the user during turbulence in an attempt to stabilize the user's hand. However, these current generation displays are not designed for hand stabilization appropriate for use in multi-touch operations.

BRIEF DESCRIPTION OF THE INVENTION

In one embodiment, a system for improving touch screen display use during vibration and turbulence conditions includes a sensor configured to transmit a first input signal relative to a measured parameter of the vehicle, a touch screen input and display system configured to transmit a second input signal relative to a manual input by a user. The touch screen input and display system includes a planar input and viewing surface having a plurality of edges and a bezel at least partially surrounding the surface proximate at least some of the plurality of edges. The bezel includes a surface configured to engage one or more digits of one or more hands of a user and is formed of an elastomeric material. The system also includes an input unit configured to receive the transmitted first and second input signals.

In another embodiment, a method of improving touch screen display use during vibration and turbulence conditions includes landing at least one digit of at least one hand of a user on a bezel at least partially surrounding a touch screen input and display device and engaging a touch activated area of the touch screen input and display device with at least one other digit of the at least one hand. The method further includes determining an amount of motion influence of the at least one hand is due to at least one of vibration, shock, and turbulence associated with at least one of the touch screen input and display device and the hand and adjusting the touch-activated area using the determined amount of motion influence.

In yet another embodiment, a touch screen input and display system includes a touch screen including a planar input and viewing surface having a plurality of edges and a bezel at least partially surrounding the surface proximate at least some of the plurality of edges, the bezel including a surface configured to engage one or more digits or one or more hands of a user, the surface formed of an elastomeric material.

BRIEF DESCRIPTION OF THE DRAWINGS

FIG. 1 is a schematic block diagram of a vehicle control system in accordance with an exemplary embodiment of the present invention; and FIG. 2 is a cross-sectional view of the bezel shown in FIG. 1 taken along the lines 2-2 also shown in FIG. 1 in accordance with an exemplary embodiment of the present invention.

DETAILED DESCRIPTION OF THE INVENTION

The following detailed description illustrates embodiments of the invention by way of example and not by way of limitation. It is contemplated that the invention has general application to improving touch screen display use during vibration and turbulence conditions in industrial, commercial, and residential applications.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

In an embodiment of the present invention an ergonomic physical stabilization edge is formed in the bezel of a touch screen display such that one or both hands can be stabilized while using the touch screen.

In another embodiment, a relatively thin touchpad is formed in the stabilization edge of the bezel to determine number of fingers being used for stabilization, movement due to turbulence, and a range of appropriate GUI and cursor control actions based on hand position.

Figure 1:
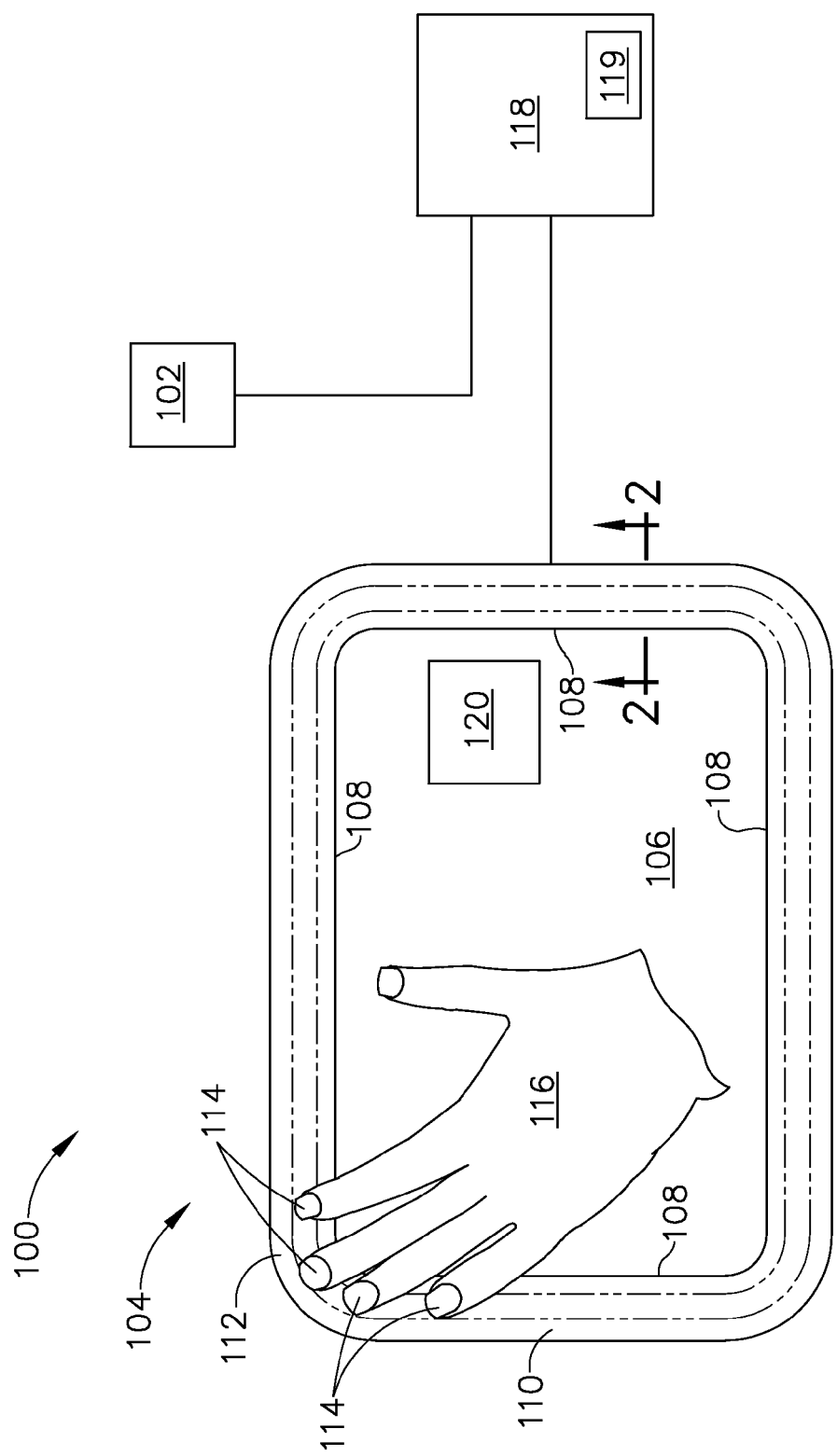
FIGS. 1 and 2 show exemplary embodiments of the method and system described herein.

FIG. 1 is a schematic block diagram of a vehicle control system 100 in accordance with an exemplary embodiment of the present invention. In the exemplary embodiment, vehicle control system 100 includes a sensor 102 configured to transmit a first input signal relative to a measured parameter of the vehicle and a touch screen input and display system 104 configured to transmit a second input signal relative to a manual input by a user. Touch screen input and display system 104 includes a planar input and viewing surface 106 having a plurality of edges 108 and a bezel 110 at least partially surrounding planar input and viewing surface 106 proximate at least some of edges 108. Bezel 110 includes a surface 112 configured to engage one or more digits 114 of one or more hands 116 of a user. In the exemplary embodiment, surface 112 is formed of an elastomeric material, for example, but not limited to, neoprene and synthetic rubber. Vehicle control system 100 also includes an input unit 118 configured to receive the transmitted first and second input signals for use by a processor 119 for further processing and/or transmission to other processes.

Planar input and viewing surface 106 comprises a touch activated area 120 configured to receive a manual input from a digit 114, for example, a finger or thumb of the user.

Figure 2:
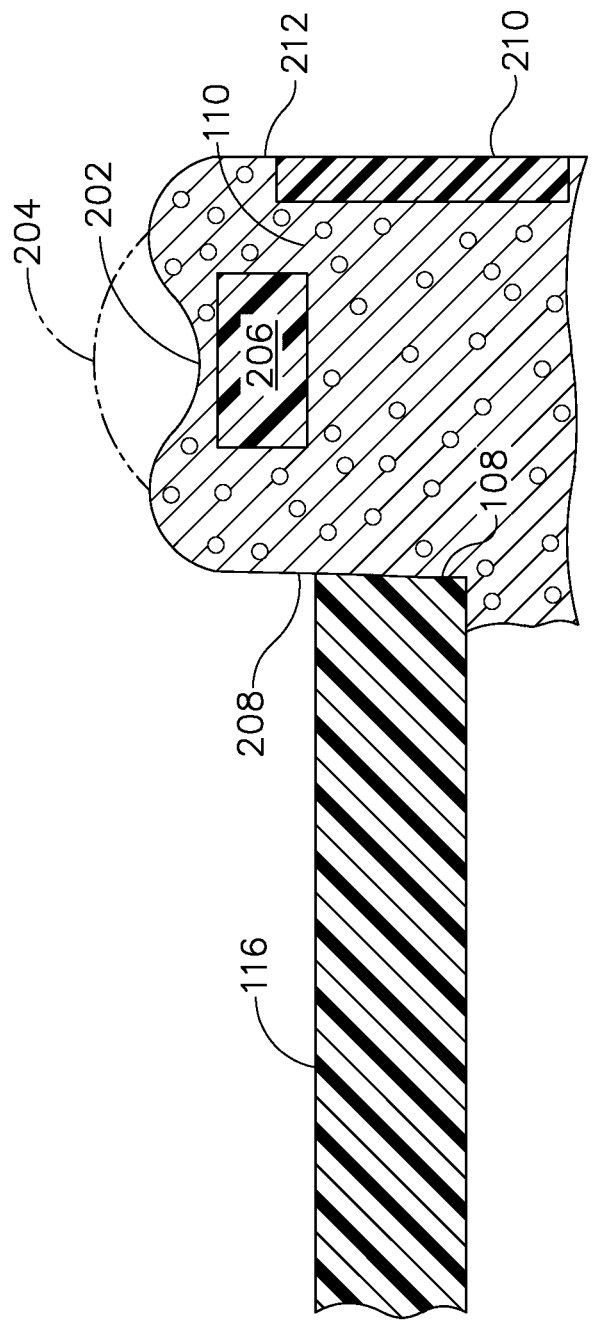

FIG. 2 is a cross-sectional view of bezel 110 taken along lines 2-2 (shown in FIG. 1) in accordance with an exemplary embodiment of the present invention. In the exemplary embodiment, bezel 110 comprises a trough 202 configured to engage one or more digits 114 of one or more hands 116 of the user. In another embodiment, bezel 110 comprises a protrusion 204 configured to engage one or more digits 114, for example, fingers and/or thumb of one or more hands 116 of the user.

In a physical embodiment, bezel 110 is designed for finger and thumb stabilization, intended movement, and comfort during operations using planar input and viewing surface 106. Bezel 110 provides trough 202 or protrusion 204 as fingernails along left, right, and top edges 108 primarily, and further a thumbnail along the bottom edge 108 to permit a pinch grip while scrolling left and right. Bezel 110 permits finger protrusion aft from planar input and viewing surface 106, and may use a curved background surface behind planar input and viewing surface 106 to conform to first link of digits 114 to permit finger protrusion via limited opening behind the planar input and viewing surface 106 to permit heavy turbulence lockdown stabilization. Bezel 110 provides several options for surface 112 including a soft thermoplastic elastomer for damping turbulence and increasing comfort. Surface 112 may also include a textured portion to increase friction, adjacent to a smooth nylon portion used to permit smooth sliding coupled with on-screen interaction. The textured portion may be formed in distal trough 202 while the smooth surface is formed on a proximal side planar surface 208.

In various embodiments, bezel 110 comprises a sensor 206 configured to detect at least one of vibration, shock, and turbulence. Sensor 206 may be formed integrally with bezel 110, for example, but not limited to, embedded on or within surface 112 proximate trough 202 or protrusion 204. In an alternate embodiment, sensor 206 may be positioned in another location. Sensor 206 is configured to generate an output relative to a motion component between touch screen input and display system 104 and the user resulting from the at least one of vibration, shock, and turbulence. Sensor 206 is configured to determine a number and placement of the one or more digits 114 using at least one of capacitance, proximity, acceleration, force, and a combination thereof.

Touch activated area 120 is configured to be at least one of relocated and resized on planar input and viewing surface 106 based on an input from sensor 206, which is configured to determine a motion influence due to at least one of vibration, shock, and turbulence.

Planar input and viewing surface 106 may alternatively be sized for use by a range of human anthropometric dimensions, allowing two stabilized hands to permit touching thumbs proximate a center of planar input and viewing surface 106. Different line replaceable bezel widths may be used for different hand and finger sizes.

In an interactive embodiment, bezel 110 is an active user-interface incorporating a thin, bezel-integrated touchpad 210 extending around an outside edge 212 of bezel 110. Touchpad 210 may be used to identify an intended graphical focus area on planar input and viewing surface 106, to control vertical and/or horizontal scroll bars, for increasing or decreasing quantitative or graphical displays, for panning, zooming, or rotating the screen, for determining finger positions for GUI behavior, and for determining turbulence input and damping its effects as the pilot interacts with the screen.

System 100 determines a position of hand 116 and a number of digits 114 that are being used to interact with touch screen input and display system 104 and, in one embodiment, further determines an unintended digit anchor point movement based on a measured turbulence via, for example, but not limited to, rapid up/down movement of a digit anchor point, and adjusts the sensed finger or thumb input on touch screen input and display system 104 in direction opposite to the unintended anchor point movement. System 100 thus determines and corrects unintended digit touch point movement based on measured turbulence and movement of the digit touch point.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 119, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is reducing unintentional hand and finger movement when using a touch screen in vibration and turbulence conditions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of improving touch screen display use under vibration and turbulence provides a cost-effective and reliable means of bringing intuitive aspects of multi-touch touch screens to flight deck applications in a method that is usable by a pilot operating under vibration or turbulence. As a result, the methods and systems described herein facilitate operating vehicles, such as, aircraft in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A vehicle control system comprising:
a first sensor configured to transmit a first signal relative to a measured parameter of the vehicle;
a touch screen input and display system comprising:
a planar input and viewing surface having a plurality of edges and a touch activated area configured to generate a second signal relative to a manual input received from a user; and a bezel at least partially surrounding said surface proximate at least some of said plurality of edges, said bezel comprising:
   a surface configured to engage one or more fingers of one or more hands of a user, said surface formed of an elastomeric material; and
   a second sensor configured to:
      determine an anchor point represented by a number and placement of the one or more fingers on said surface of said bezel;
      measure a motion of said one or more fingers relative to said bezel, said motion caused by at least one of vibration, shock, and turbulence; and
      generate a third signal representing a magnitude and direction of said motion; and
an input unit configured to:
   receive the first signal, the second signal, and the third signal; and
   relocate or resize the touch activated area based on the first signal and the third signal to compensate for said motion of said one or more fingers caused by at least one of vibration, shock, and turbulence; and
   adjust the second signal representing the manual input in a direction opposite said motion of said one or more fingers to compensate for said motion.

2. A system in accordance with claim 1, wherein said touch activated area is configured to receive a manual input from a finger, said touch activated area configured to be at least one of relocated and resized on said touch screen based on an input from a sensor configured to use at least one of capacitance, proximity, acceleration, force, and a combination thereof to determine the magnitude and direction of the motion of the user with respect to said touch screen due to at least one of vibration, shock, and turbulence.

3. A system in accordance with claim 1, wherein said bezel comprises at least one of a trough and a protrusion configured to engage one or more fingers of one or more hands of the user.

4. A method of improving touch screen display use during vibration and turbulence conditions comprising:
   landing at least one digit of at least one hand of a user on a bezel at least partially surrounding a touch screen input and display device, the bezel comprising at least one of a vibration, shock, and turbulence sensor;
   engaging a touch activated area of the touch screen input and display device with at least one other finger of the at least one hand, thereby generating a touch input;
   determining an anchor point represented by a number and placement of the at least one digit on the bezel;
   determining a magnitude and direction of motion of the at least one digit and the anchor point relative to the bezel based on the output of the at least one of a vibration, shock, and turbulence sensor, wherein the motion is due to turbulence; and
   adjusting the touch input in a direction opposite the anchor point movement based on the determined magnitude and direction.

5. A method in accordance with claim 4, wherein landing at least one flew digit of at least one hand of a user on a bezel comprises landing at least one finger of at least one hand of a user in a trough formed in a surface of the bezel and sized to receive the at least one finger.

6. A method in accordance with claim 5, wherein landing at least one finger of at least one hand of a user on a bezel comprises landing at least one finger of at least one hand of a user on a surface of protrusion extending from the trough, the protrusion formed of an elastomeric material.

7. A method in accordance with claim 4, wherein landing at least one digit of at least one hand of a user on a bezel comprises landing at least one finger of at least one hand of a user on a resilient surface of the bezel.

8. A method in accordance with claim 4, wherein landing at least one digit of at least one hand of a user on a bezel comprises landing at least one finger of at least one hand of a user on the bezel formed of elastomeric material.

9. A method in accordance with claim 4, wherein determining the magnitude and direction of motion comprises measuring an amount of movement of the at least one digit with respect to the bezel.

10. A method in accordance with claim 4, wherein determining the magnitude and direction of motion comprises measuring an amount of movement of the at least one digit with respect to the bezel using at least one of a capacitance parameter and a proximity parameter.

11. A method in accordance with claim 4, wherein determining the magnitude and direction of motion comprises measuring an amount of movement of the at least one digit with respect to the bezel using at least one of an acceleration parameter and a force parameter.

12. A method in accordance with claim 4, wherein engaging a touch activated area comprises touching the touch activated area using a thumb of the hand.

13. A method in accordance with claim 4, further comprising at least one of relocating the touch-activated area and enlarging the touch-activated area to facilitate said engaging during the at least one of vibration, shock, and turbulence based on the determined magnitude and direction of motion.

14. A touch screen input and display system comprising:
   a touch screen comprising a planar input and viewing surface having a plurality of edges;
   a bezel at least partially surrounding said surface proximate at least some of said plurality of edges, said bezel comprising a surface configured to engage one or more fingers of one or more hands of a user, said surface formed of an elastomeric material, said bezel comprising at least one of a vibration, shock, and turbulence sensor configured to:
      determine an anchor point represented by a number and a placement of the one or more fingers of the one or more hands of the user on said surface of said bezel, and
      generate an output signal representing a magnitude and direction of motion between said touch screen and the user resulting from at least one of vibration, shock, and turbulence; and
   an input unit configured to:
      relocate or resize a touch activated area of the touch screen based on the output signal to compensate for the motion of the finger of the user and the anchor point due to turbulence conditions, wherein the anchor point movement represents a change in the anchor point on the surface of the bezel as detected by at least one of the vibration, the shock, and the turbulence sensor.

15. A system in accordance with claim 14, wherein said sensor is configured to determine a number and placement of the one or more fingers using at least one of capacitance, proximity, acceleration, force, and a combination thereof.

16. A system in accordance with claim 14, wherein said touch activated area is configured to receive a manual input from a finger and adjust the manual input in a direction opposite the anchor point movement based on the output signal.

17. A system in accordance with claim 14, wherein said bezel comprises at least one of a trough and a protrusion configured to engage one or more fingers of one or more hands of a user.

18. A system in accordance with claim 1, wherein said system is further configured to:
   determine a position of the one or more hands of the user;
   determine a placement of the one or more fingers of the user;
   measure turbulence using the turbulence sensor; and
   determine the unintended anchor point movement based on the position of the one or more hands, the placement of the one or more fingers, and the measured turbulence.

19. A system in accordance with claim 14, wherein said system is further configured to:
   receive a determined position of the one or more hands of the user;
   receive a determined placement of the one or more fingers of the user;
   receive a measured turbulence value; and
   determine the unintended anchor point movement based on the determined position of the one or more hands, the determined placement of the one or more fingers, and the measured turbulence value.

20. A system in accordance with claim 1, wherein said planar input and viewing surface is sized for use by a range of human anthropometric dimensions, and configured to permit two stabilized hands to touch thumbs proximate a center of said planar input and viewing surface.

* * * * *